Patented Sept. 7, 1937

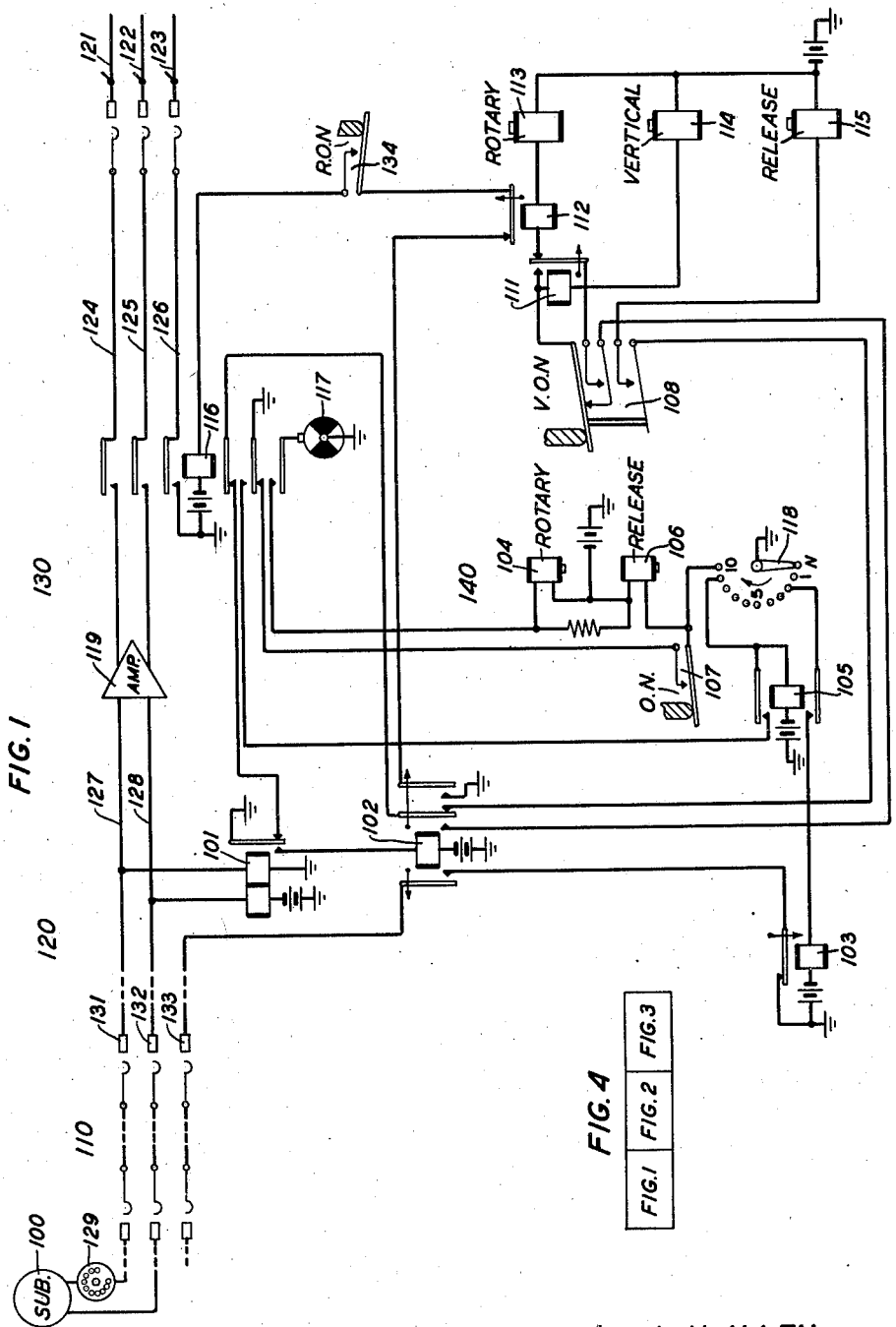

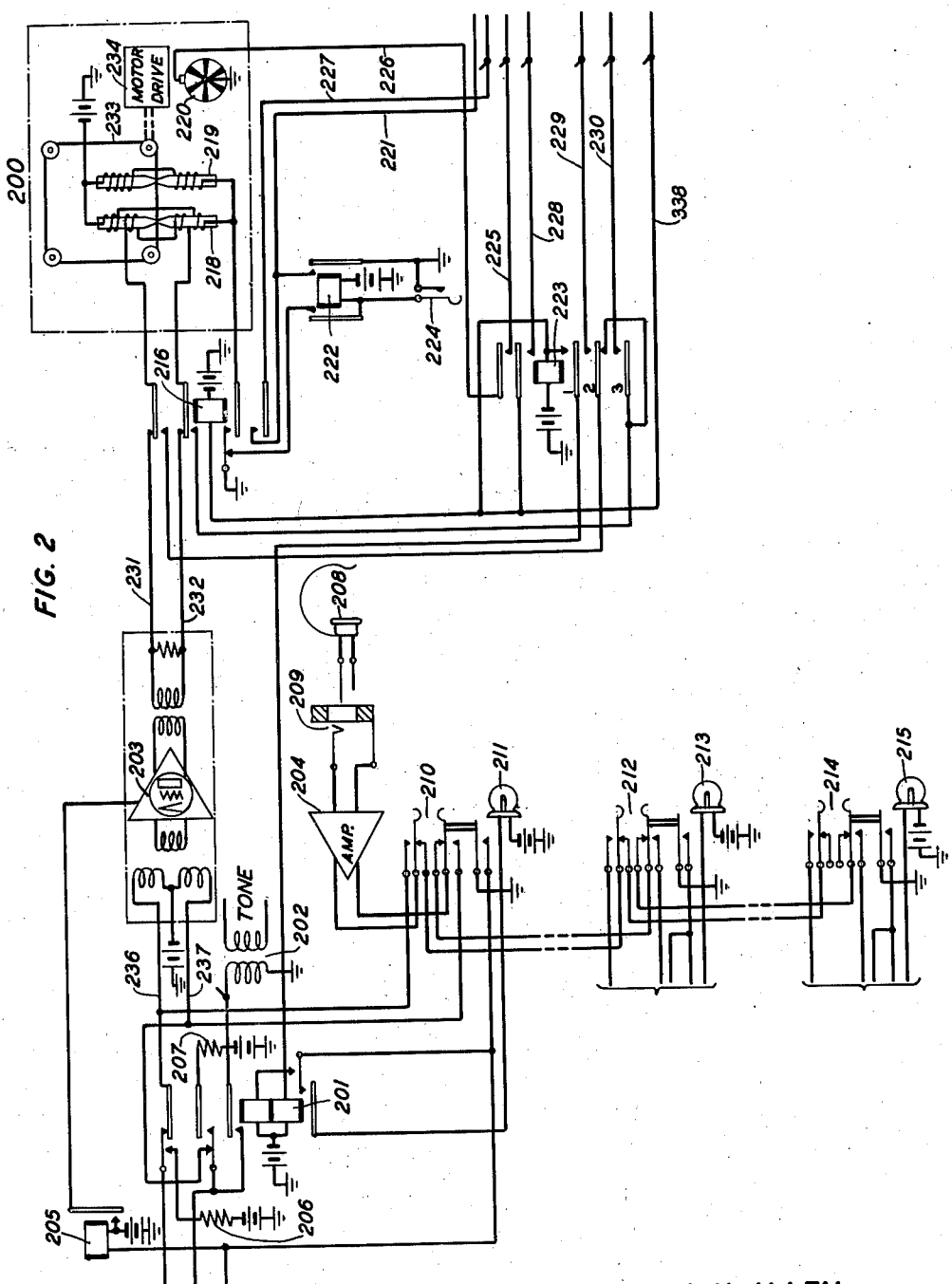

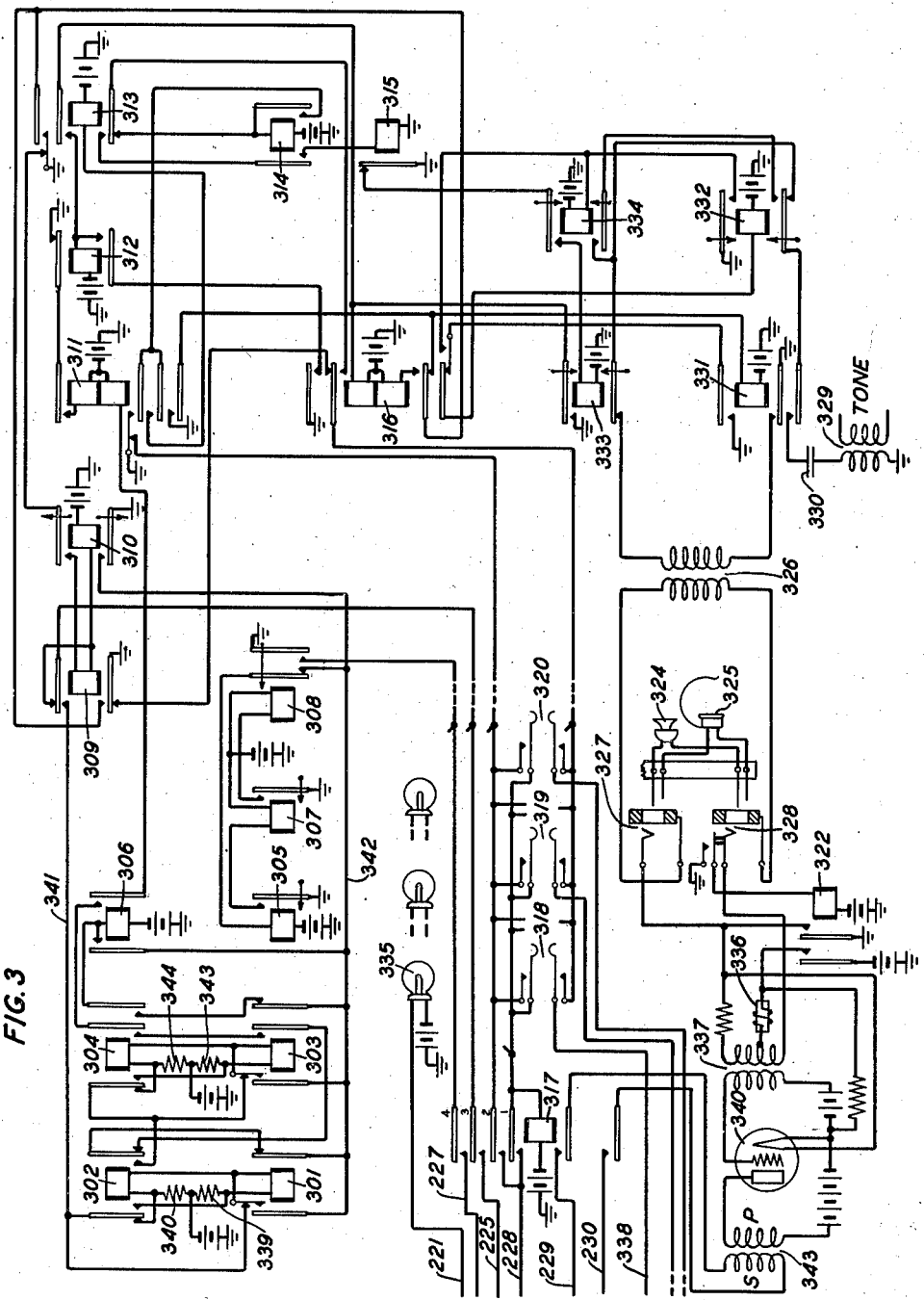

2,092,493

UNITED STATES PATENT OFFICE 2,092,493

AUTOMATIC STOCK QUOTATION SYSTEM

Lawrence H. Allen, Summit, N. J., and John W. Gooderham, Larchmont, N. Y., assignors to Bell Telephone Laboratories, Incorporated, New York, N. Y., a corporation of New York Application December 8, 1934, Serial No. 756,590

10 Claims. (Cl. 179—6)

This invention relates to signaling systems and more particularly to an automatic stock quotation system involving the use of magnetic steel tape recorders.

In metropolitan centers where the marketing of produce and securities is carried out on a large scale, it is desirable to have at hand some means for quickly and accurately obtaining a quotation on the current market price of any particular product or security.

Broadly considered, the object of the invention is to obtain an efficient automatic stock quotation service whereby those who subscribe to the service may, upon the proper manipulation of the calling device, obtain the pronouncement of a quotation message which has been magnetically transcribed on a steel tape recorder.

More particularly, the present invention comprises certain novel features and improvements on the system disclosed in the patent application of H. H. Abbott, Serial No. 753,035, filed Nov. 14, 1934. By the means provided in the present invention, stock quotation records are supervised after they are transcribed and before they are made available to subscribers so that if error is made in the transcription of a quotation, it is not made available to subscribers until it is corrected.

Another feature of the present invention relates to means for preventing the recording operator from superimposing the quotation of one security upon the quotation of another security into a magnetic recorder that is still attached to her position after the first quotation has been recorded, and to further prevent said operator from wiping out a pronouncement quotation on the recording apparatus should the key by which said recording apparatus is caused to be connected to the operator's position be inadvertently held operated after the operator has pronounced a quotation. In each of these cases, the operator is given a warning tone to release the key associated with a particular recording apparatus during which time the talking connection between the position and said recording apparatus is cut off.

Another feature of the invention is the provision of means by which an operator, upon depressing the key associated with the particular magnetic recorder, is placed in an immediate position for recording the new quotation without the necessity of first listening to the quotation thereon recorded. In this manner, a considerable economy in time is effected.

Another feature of the invention is the use of a one-way repeater in the connection between a subscriber's line and the magnetic recorder in order to prevent subscribers connected to the same recorder from talking to each other, or to prevent one subscriber from interfering with another subscriber by making audible noises in his telephone transmitter.

As an illustration of the manner in which the invention may be applied, one embodiment of it is herein completely described with reference to a specific kind of information system; that is, a security quotation system in which the "bid" and "asked" prices of a particular stock or bond are recorded by an operator on an individual tape recorder the connection of which, with the operator's transmission apparatus, is controlled through a key individual to said recorder; the connection of the tape with the telephone instrument of an inquiring subscriber being made over a series of switching stages settable by an impulse code. It is understood, however, that the invention is not limited to a stock quotation system, or to a telephone system, as it is apparent from the principles of the disclosure herein contained that the breadth of its application is limited only by the number of impulse codes possible with a given dial and the length of the message which may be recorded on the tape; the invention obviously being applicable to any electrical network operating on an impulse registration basis in which the impulses are used to control the necessary number of switching stages for reaching a particular tape recorder. In accordance with the invention, therefore, one specific embodiment of which is disclosed herein by way of illustration, this is accomplished in the following improved manner:

The automatic security quotation system herein contemplated comprises a telephone line, a number of tape recorders, means by which said line can be extended to any of said recorders, an operator's position from which said recorders may be reached for purposes of recording messages therein, and a supervisory position from which recorded messages may be supervised. The talking outlet of each recorder terminates, through a suitable amplifier, on a group of terminals on the bank of the last switching selector of the train of selectors which can be made to connect the subscriber's line with the recorder, while the recording inlet to each of said recorders is established by any suitable means to the operator's position from which pronouncement messages are transmitted for purposes of recording. Consequently, when it is desired to record, or change, the "bid" and "asked" quotations of a security on the associated tape recorder, the operator depresses a key designating that security and thereby causes the circuit of the erasing magnets in said tape recorder to be operative in removing the previous record on the tape in advance of the passage of said tape between the poles of the "voice" magnets, whose coils are responsive to the voice currents initiated by the operator during the pronouncement period. As soon as the tape recorder is electrically connected to the operator's position, a tone circuit is provided to apprise the operator that she may begin the quotation of the message, for which purpose a definite time period is allowed equal to the time taken for the whole tape to pass underneath, or between, the poles of the erasing magnets and those of the voice magnets. During this time, that is, during the time that the quotation is being recorded on the tape, a warning tone is connected to the terminals of the tape recorder to which subscribers' lines may be extended to advice said subscribers that the quotation is being changed. Should the supervisory operator be in a position to supervise quotations at this time, she will compare the quotation from the primary information source with the quotation that she listens in on at the magnetic recorder. Should the two not correspond, the originating operator is requested by the supervising operator to change the quotation.

The subscriber who wishes to obtain a quotation dials a code designating the particular security and the switching selectors responsive to the dial impulses are positioned to reach the connecting terminals on the associated tape recorder. Through suitable amplifiers the quotation contained on the recorder is transmitted to the subscriber who will thus be enabled to hear two quotations in succession as measured by two revolutions of the tape containing the pronouncement. Thereafter, the subscriber's line is automatically disconnected from the terminals of the line in order to prevent a number of subscribers equal to the number of final connectors provided from making the same quotation line unavailable to others.

A clearer conception of the scope and purpose of the invention may be obtained from the following description, appended claims and attached drawings in which:

Fig. 1 shows a switching train including a final connector for extending a calling line to a number of tape recorder announcing circuits;

Fig. 2 shows a typical tape recorder announcing circuit, part of the recording circuit, and the monitoring facilities for checking the accuracy of quotations.

Fig. 3 shows a recording operator's position with means for connecting said position to a plurality of tape recorders; while Fig. 4 shows the manner in which Figs. 1, 2, and 3 are to be arranged with respect to each other for a complete disclosure of the invention.

The invention will now be considered by first describing the manner in which a quotation pronouncement is changed, or impressed, on a tape recorder and by then describing how such a quotation can be verbally announced to subscribers who dial the code number assigned to the security associated with a particular recorder.

To occupy the recording position shown in Fig. 3, the operator plugs the transmitter-receiver 324 and 325 of her head-set into the position jacks 327 and 328. As a result, the upper tip contacts of jack 328 are closed and an obvious circuit is completed for relay 322 which, on operating, connects ground to one side of the transmitter 324 by way of tip of jack 327 and battery to the other side of the transmitter by way of battery supply coil 336, lower half of the primary winding of input transformer 337 of the recording amplifier 340 and tip of jack 328. The operation of relay 322 further completes the circuit to light the filament of the thermionic elements of said amplifier, which is only diagrammatically disclosed in the drawings, so that, when a circuit from the output of said amplifier to the voice magnets 218 is completed as described hereinafter, the pronouncement circuit between the primary side of said amplifier and the operator's telephone instrument can be varied by voice undulations to cause a corresponding but alternating current variation in the secondary circuit.

The operator is now in a position to record quotations in any tape recorder 200 to which her position may be connected as described hereinafter.

When a quotation is changed on any particular security a key 224, assigned to said security at the quotation board, is operated whereupon an obvious circuit is completed for relay 222 which, on operating, locks over its left contacts to ground on the lower normal contacts of relay 216, and further closes a circuit to light lamp 335, individual to the particular security at the recording position and within view of the operator at said position. The circuit for lamp 335 extends from ground on the right contacts of relay 222, conductor 221, lamp 335 to battery. When the operator observes the lighted lamp, indicating that the quotation of the security indicated by the lamp is to be changed, she observes the stock quotation board and obtains the new quotation therefrom, whereupon she operates the particular start key associated with the security in question, as, for instance, key 318, and a circuit is thereby completed which extends from ground on the bottom back contacts of relay 309, top inner back contacts of relay 316, bottom contacts of key 318, conductor 336, winding of relay 216 to battery and, in parallel therewith, winding of relay 223 to battery. Through the top contacts of key 318 another circuit is closed extending from ground on the bottom inner normal contacts of relay 311, top contacts of key 318, winding of relay 317 to battery. Relays 216, 223 and 317 operate. Relay 216, on operating, disconnects the inner windings of the voice magnets 218 from the input transformer of amplifier 203 and connects them in series with the secondary windings of the output transformer 343 of amplifier 340 in a circuit extending over a closed path from the top side of the (S) winding of transformer 343, bottom inner contacts of relay 317, conductor 229, No. 2 contact set of relay 223, top outer front contacts of relay 216, top lower winding of upper voice magnet 218, bottom upper winding of lower voice magnet 218, top inner front contacts of relay 216, No. 3 contact set of relay 223, conductor 230, bottom outer contacts of relay 317, to the bottom side of the (S) winding of transformer 343. In addition, relay 216 connects ground over its bottom inner front contacts to the outer direct current windings of the voice magnets 218 and to the winding of the erasing magnets 219.

The magnetic tape 233 of the recording and announcing unit 200, is constantly passing between the poles of the voice and erasing magnets 218 and 219, respectively, by virtue of the motor drive 234 and cooperating driven elements. The direct current through the erasing magnets 219 produces magnetic saturation in the tape as it passes through the pole-pieces of these magnets. The direct current through the direct current windings of the voice magnets neutralizes the residual magnetism in said tape so as to present the tape in a magnetically neutral condition when it passes between the poles of the voice magnets 218 and ready to be magnetically acted upon by the magnetic field produced by the current through the voice coils. The operation of relay 216 further opens the circuit of relay 222 which releases and transfers the circuit of lamp 335 to the outer contacts of relay 308 over a path including the bottom outer contacts of relay 216, conductor 227, No. 4 contact set of relay 317, to the contacts of relay 308. As will be explained hereinafter, relay 308 has already operated and, in cooperation with relays 305 and 307, functions to flash lamp 335 as an indication to the operator that her position apparatus has been successfully attached to the magnetic recorder of the particular security controlled by key 318.

Relay 223, on operating, closes a circuit for relay 201 extending from battery through the lower winding of said relay to ground on the locking contacts of relay 223. Relay 201 operates and performs functions described hereinafter. Relay 223, in addition to completing the circuit from the windings of the voice magnets 218 to the recording amplifier 340, further connects grounded interrupter 220, which is geared (not so shown) to the tape driving shaft, to the winding of relay 310 over a path extending from one side of the interrupter, conductor 226, the top outer contacts of relay 223, conductor 225, No. 3 contacts of relay 317, top back contacts of relay 309, winding of relay 310 to battery. Interrupter 220 has a number of metallic and insulating segments of which the former are connected to ground. The interrupter is geared to the driving shaft of the tape and driven at such a speed as to produce six groups of grounded and open intervals over conductor 226 during one complete passage of the tape. The object of doing this is to count off the interval of time taken for the tape to make one complete passage between the poles of the voice and erasing magnets and during which the recording operator is allowed to pronounce a new quotation. The circuit is so arranged that the operator is given two zip tones at the beginning of the tape passage as a signal to begin speaking the new quotation and one zip tone at the end of the tape passage as an indication to stop any further pronouncement. The speed with which the tape is driven and, therefore, the rate at which the impulses are produced, can be adjusted to the particular speed necessary to allow the operator to speak the entire quotation in the interval between the two sets of zip tones. Should the operator fail to complete the pronouncement of the quotation prior to the reception of the final zip tone, she will have to operate the security key as, for instance, key 318, once again and repeat the quotation at a more rapid rate.

Hence as soon as relay 223 operates and the interrupter path to relay 310 is closed as described, the first ground closure of said interrupter will be effective to operate relay 310. This relay operates and, over its bottom contacts, completes a circuit to the winding of relay 305 by way of the inner contacts of relay 308 causing relay 305 to operate while over its top contacts it completes a shunting path to the winding of relay 309 from ground on the top normal contacts of relay 313, said relay 309 having interrupter ground connected to the other side of its winding by way of its own top back contacts. Relay 305, on operating, closes an obvious circuit to operate relay 307 which relay on operating, closes an obvious circuit to operate relay 308. Relay 308 opens the circuit of relay 305 and further completes a circuit to lamp 335 from ground on its outer contacts, No. 4 contacts of relay 317, conductor 227, lower outer contacts of relay 216, conductor 221 to lamp 335. However, when relay 305 released, it opened the circuit of relay 307 which, on releasing, opens the circuit of relay 308 whereupon the circuit of relay 305 is closed again and the circuit of lamp 335 is opened, the cycle of operation and release between relays 305, 307 and 308 continuing, in turn rapidly flashing lamp 335 as a signal to the operator that the quotation cycle has begun.

When interrupter 220 has advanced to position an insulating segment beneath its contact brush, the shunt around the winding of relay 309 is removed and this relay operates and locks in series with relay 310 to ground on the top normal contacts of relay 313. Relay 309, on operating, extends the interrupter conductor 225 from the No. 3 contacts of relay 317, over the top front contacts of relay 309, conductor 341, to the left back contacts of relay 302 and to the left normal contacts of relay 301 while, over its bottom front contacts, it completes a circuit to the winding of relay 331 by way of the bottom inner back contacts of relay 316. Relay 331 operates and completes a tone circuit from ground, left winding of tone transformer 329, condenser 330, bottom outer contacts of relay 331, bottom back contacts of relay 332, bottom contacts of relay 333, right winding of transformer 326 to ground on the bottom inner contacts of relay 331. The tone current thus caused to flow through the above described circuit is induced, though higher in intensity, in the secondary circuit of transformer 326 which extends from one side of the secondary winding of said transformer, sleeve of upper jack 327, receiver 325, sleeve of lower jack 328 to other side of the secondary winding of said transformer. The operator hears the tone which is the beginning of the first of the two short zip tones that will endure for the interval between the operation of relay 331 and the operation of slow-to-operate relay 332. As soon as relay 331 operates it completes the circuit of said relay 332 from ground through its upper contacts, bottom outer back contacts of relay 316, winding of relay 332 to battery. Relay 332 operates, opens the tone circuit and closes an obvious circuit for relay 334 which, on operating, completes a circuit for relay 333 extending from ground on the back contacts of relay 315, top contacts of relay 334, winding of relay 333 to battery, and further recloses the primary tone circuit to produce the second zip tone over its bottom front contacts and bottom contacts of relay 333 to one side of the primary winding of transformer 326 as before traced. Inasmuch as relay 333 is of the slow-to-operate type, the tone circuit will be maintained for the short interval it takes said relay to operate whereupon said tone circuit is then opened at its bottom contacts. Relay 333 further closes an obvious circuit to the upper winding of relay 316 which operates and locks over its lower winding and bottom inner front contacts to ground on the lower front contacts of relay 309. Relay 316 performs no useful function at this time except to open the original operating path of relay 331 and to prevent its further operation from the lower front contacts of relay 309.

After listening to the second zip tone the operator begins the pronouncement of the quotation which takes place during the period of one passage of the recording tape 233 between the poles of the voice and erasing magnets 218 and 219 and which period is measured by the six pulse interruptions of interrupter 220 as follows:

When interrupter 220 advances to position the next or first ground segment beneath its brush after the operation and locking of relays 309 and 310, a circuit path is completed for relay 301 extending from previously traced interrupter ground to the left normal contacts of relay 301, winding of relay 301, resistance 339 to battery. Relay 301 operates, closes its left contacts and extends ground thereover from the bottom contacts of relay 310 to its own winding and to one side of relay 302 which, however, is shunted by interrupter ground on the other side of its winding extended thereto over its own left back contacts.

On the contacting of the succeeding or first insulating segment of interrupter 220, ground is disconnected from conductor 341, the shunt around relay 302 is thereby removed, and this relay now operates in a circuit which extends from battery through resistance 340, winding of said relay, left front contacts of relay 301, conductor 342, to ground on the bottom contacts of relay 310.

On the contacting of the succeeding or second grounded segment of the interrupter, ground is again connected to conductor 341 whereupon relay 301 is short-circuited through the left front contacts of relay 302 causing relay 301 to release. The release of said relay causes relay 302 to hold to interrupter ground through the left normal contacts of relay 301 and further completes a circuit for relay 303 from battery through resistance 343, winding of relay 303, left normal contacts of relay 302, right front contacts of relay 301, right contacts of relay 301 to ground on conductor 342. Relay 303 operates, locks to ground on conductor 342 over its left front contacts and further causes said ground to be extended through said contacts to one side of the winding of relay 304 which further has the operating ground for relay 303 connected to the other side of its winding through its own left back contacts.

On the contacting of the succeeding or second insulating segment of interrupter 220, ground is disconnected from conductor 341 and inasmuch as relay 302 is holding to this ground, said relay now releases, in turn removing the shunting ground from the winding of relay 304 through its right front contacts, whereupon relay 304 operates in a circuit which extends from battery through resistance 344, winding of relay 304, left front contacts of relay 303 to ground on conductor 342.

On the contacting of the succeeding or third grounded segment of interrupter 220 the original circuit path for operating relay 301 is again closed whereupon relay 301 operates and relay 302 is shunted as before.

On the contacting of the succeeding or third insulating segment of the interrupter relay 302 is operated.

On the contacting of the succeeding or fourth grounded segment of the interrupter, relay 301 is released as before and a shunting path for relay 303 is now completed from ground on conductor 342, right contacts of relay 301, right front contacts of relay 302, left front contacts of relay 304, to the battery side of the winding of relay 303 causing said relay to release. A circuit is completed for relay 306 extending from battery through the winding of said relay, right outer contacts of relay 304, right outer contacts of relay 303 to ground on conductor 342. Relay 306 operates and locks to ground on conductor 342 through its left contacts, but otherwise performs no useful function at this time.

On the contacting of the succeeding or fourth insulating segment of the interrupter, relay 302 releases whereupon the circuit which holds relay 304 is opened and this relay releases.

On the contacting of the succeeding or fifth grounded segment of the interrupter, relay 301 operates as before while on the contacting of the following fifth insulating segment relay 302 operates.

On the contacting of the next or sixth grounded segment relay 301 releases and relay 303 operates as previously described while on the contacting of the next or sixth insulating segment, relay 302 releases and relay 304 operates.

The sixth insulating period of the interrupter marks the complete passage of recording tape 233 between the poles of the voice and erasing magnets 218 and 219, respectively, and thereby marks the end of the quotation pronouncement period. Consequently with relays 303, 304 and 306 operated, a circuit is completed for relay 311 which extends from battery through the lower winding of said relay, right contacts of relay 306, right inner contacts of relay 304, right inner contacts of relay 303, right back contacts of relay 302, right contacts of relay 301, to ground on conductor 342. Relay 311 operates, locks over its top winding and contacts to ground on the top contacts of relay 312 and initiates the operation of circuits to signal the operator that the end of the quotation cycle has been reached.

Relay 311 removes ground from conductor 220 and thereby causes the release of relays 216 and 223 which open the pronouncement circuit to the operator's position so that no further speech can be recorded on the tape 233, closes an obvious circuit for relay 331 which operates and closes the previously traced tone circuit whereby, through a previously traced secondary circuit inductively coupled to said tone circuit, the operator hears the zip tone that marks the end of the quotation cycle. Inasmuch as relay 316 is already operated, relay 331 completes a circuit for relay 334 which extends from ground on the top contacts of relay 331, lower outer front contacts of relay 316, winding of relay 334 to battery. Relay 334 operates and completes a circuit for relay 333 extending from ground on the contacts of relay 315, top contacts of relay 334 to battery. Relay 333 operates and opens the primary tone circuit thereby terminating the zip tone heard by the operator and marks the end of the interval during which the operator should have spoken the quotation announcement into the recording circuit. Should the operator have failed to pronounce the complete quotation in the interval marked by the first two zip tones and the last, she may depress the proper security key once again, as for instance, key 318, and repeat the pronouncement of the quotation at a more rapid rate.

In the meanwhile, the operation of relay 311 further closes a circuit for relay 313 which extends from battery through the winding of said relay, lower middle and lower inner front contacts of relay 311 to ground. Relay 313 operated, disconnects holding ground for relays 309 and 310 which now release, relay 310 opening the circuit for the interrupted operations of relay 305, 307 and 308 and thereby stopping the flashing of the lamp 335; connects a supplementary ground over its top outer contacts to hold relay 316, and closes a circuit for relay 312 extending from battery through the winding of said relay, top inner contacts of relay 313, top contacts of relay 333 to ground. Relay 312 operates, locks to ground on the top outer front contacts of relay 316 and opens the locking ground to relay 311 which releases, thereby opening the circuit of relays 313 and 331. The release of relay 313 releases relay 316. The release of relay 316 now opens the circuit of relay 334 which releases, and further releases relay 333, thereby restoring the entire announcing circuit to normal.

The operator, with the circuit arrangement of this invention, is instructed to operate a security key only momentarily. However, should said operator keep the key depressed until after the completion of the quotation cycle, as marked by the closure of the tone circuit for the terminating zip tone, then the fact that relay 316 is operated serves to complete a circuit for relay 314 which extends from battery through the winding of said relay, bottom back contacts of relay 313, top inner front contacts of relay 316, lower contacts of key 318, conductor 338, top inner contacts of relay 223, conductor 228, No. 2 contacts of relay 317, to ground on the lower inner contacts of relay 311. Relay 314 operates but performs no useful function at the beginning of the pronouncement circuit and remains operated throughout the quotation cycle. When, at the end of the cycle, relay 311 operates, relay 314 is locked to ground on the lower inner front contacts of relay 311 and, when relay 313 operates in consequence of the operation of relay 311, a circuit is completed for relay 315 which extends from ground through the winding of said relay, left contacts of relay 314, bottom front contacts of relay 313, top inner front contacts of relay 316, lower contacts of key 318, conductor 338, the windings of relays 216 and 223 in parallel, to battery on one of said windings. Relay 315 operates and opens the operating circuit of relay 333 so that once the final zip tone circuit is completed, it will not be broken after a short interval by the operation of relay 333. Under the conditions just described, the tone would not be removed from the operator's circuit and she would, therefore, be advised to release the key by the continuation of the tone. At the same time, the failure to operate relay 333 prevents the release of the circuit by failing to close through the circuit of relay 312 to ground on the top contacts of relay 333. When, however, the key is released, the circuit of relay 315 and, therefore, the circuit of relays 216 and 223, is opened, whereupon the previously described circuit of relay 333 is completed, operating said relay which, in turn, closes a circuit to operate relay 312 to discharge the connection.

The reason for the above precaution is to insure against the possibility of an operator recording on the tape of one security a succeeding quotation intended for another security the key of which has not yet been depressed. It may be that the operator, in forgetting to release the key, associates a succeeding quotation for another security with the security of which the key controlling its associated tape is still operated in which event, if no guard were supplied, the quotation intended for a succeeding security would be superimposed on the recording tape connected to her position. Therefore, by providing means for insuring that the recording operator does release the key after the pronouncement of each quotation, the possibility of such an error is eliminated.

It will be observed that the winding of relay 317 is multiplied to a plurality of "security" keys. The object of this arrangement is to prevent multipling the conductors 225, 227, 228, 229, 230 and 338 of a great number of quotation pronouncement circuits together at one operator's position so that if any trouble occurs on one of the quotation circuits, it will disable only the circuit having the trouble. On the other hand if relay 317 develops trouble it will only affect the quotation circuits whose corresponding security keys are wired to its contacts and not all of the quotation circuits accessible through the position.

The organization of circuits comprising the present invention is further so arranged that a calling broker, or subscriber, may not receive a quotation after it has been changed until the new quotation has been confirmed by a monitor operator. This feature is attained by the use of relay 201 which operates in parallel with relays 216 and 223 at the time the circuit for the latter relays is closed by the depression of the appropriate security keys, as already described. When relay 201 operates, a partial locking path is prepared over its upper winding and lower front contacts which is completed to ground on the lower front contact of key 210 associated with the particular security and located on the monitoring position when such key is operated, connects conductors 121 and 122 to battery through resistances 206 and 207, respectively, and further closes a tone path to the terminals in the banks of the conductor 130 to which the announcing circuit is connected and to which terminals a calling line, such as line 100, may be extended in the manner described hereinafter so that if, at the time the quotation is being changed, a subscriber's line is connected to the announcing circuit of which the quotation is being changed, the tone path is completed to the amplifier 119 as follows: from ground through the secondary winding of transformer 202, the primary winding of which is connected to a source of tone, top inner contacts of relay 201, conductor 122 and connector terminal, connector brush and conductor 125, top middle contacts of relay 116, which is operated at this time and in the manner described hereinafter, through the amplifier 119, top outer contacts of relay 116, conductor 124 and connector brush, connector terminal and conductor 121, top outer front contacts of relay 201, resistance 206 to battery. The tone induced in the above described path is now increased by amplifier 119, which is of the heater-tube type and therefore constantly operated, in the well-known manner and repeated to the subscriber over the closed path formed through the amplifier and the subscriber's line by conductors 127 and 128 and the switching connection 110. The tone heard by the calling line, or lines (since more than one line can be connected to any group of terminals in connector 130 as more completely described hereinafter) is simply to advise the calling subscriber, or subscribers, that a quotation is in the process of change. A parallel circuit is further closed from the locking ground of relay 201 to light the pilot lamp 211 as a signal to the monitor operator that the quotation on the tape recorder indicated by the lighted lamp has been changed and is to be checked.

The monitor operator's listening circuit comprises an amplifier 204 of the well-known heater-tube-type and, therefore, only schematically shown, the input terminals of which are extended to the switching contacts of key 210 of one of the quotation circuits and, through the normal contacts of said key, serially to the keys of other quotation circuits. The output terminals of said amplifier terminate in a jack 209 into which a telephone receiver 208 or other listening device is plugged. When, therefore, the monitor operator is apprised of a change of quotation on one of the announcement circuits by the lighting of the lamp associated with the circuit on which the change is being made, as for instance, lamp 211, she depresses key 210 associated with said circuit whereupon conductors 236 and 237 of the announcing circuit are extended to the input side of amplifier 204 through the upper and lower inner make contacts of key 210. Key 210 further completes the locking circuit of relay 201, above traced, closes an obvious circuit for relay 205 which, on operating, connects plate battery to amplifier 203 and thereby makes it effective to reproduce the current induced in the primary circuit by the passage of the tape 233 of recorder 200 between the poles of the voice magnets 218.

At the end of the quotation cycle, that is, after the recording operator has completed pronouncing the new quotation into the tape 233, relay 216 is released as already described and the announcing path is then extended through the upper back contacts of relay 216, conductors 231 and 232 and thence through the primary winding of the input transformer of amplifier 203. The amplified secondary announcing circuit is further completed through the input side of amplifier 204, wherein it is further amplified and impressed through the output circuit of said amplifier, said output circuit including receiver 208.

The monitor operator listens to the pronouncement of the quotation. If satisfied that it is correct by comparing it to the quotation listed on the display board which she can observe, she releases key 210, whereupon relay 201 is released, the tone circuit is disconnected from the terminals of the connector 130, lamp 211 is extinguished and amplifier 204 as well as the monitor's telephone receiver 208 is removed from the announcement path. Through the release of relay 201, conductors 121 and 122 are now joined to conductors 236 and 237, respectively, which extend to the secondary side of reproducing amplifier 203. Relay 205 is further released to extinguish said amplifier. If, now, a connection is established from a calling line to conductors 121 and 122 as described hereinafter, said calling line will be able to hear the pronouncement recorded on the tape.

On the other hand, if the monitor operator finds that the quotation recorded is incorrect, she will communicate this fact to the recording operator by any suitable means such as, for instance, a private wire trunk, supply said recording operator with the correct quotation which will then be recorded on the tape and later checked by the monitoring operator in the manner already described.

Having described the manner in which a quotation can be recorded, changed and supervised, the manner in which a calling line obtains access to the tape recorders and from which he may obtain whatever pronouncement is recorded therein will now be described.

When a broker, whose substation is designated by line 100, desires to obtain a quotation, he dials the number assigned to the particular security. The impulses generated by the dial 129 are effective to operate a number of selector switches of the type well-known in the automatic telephone art and represented schematically by the number 110 in Fig. 1. These switches extend the calling line 100 to the terminals 131, 132 and 133 of the connector switch 130 which, in mechanical structure, is similar to the selector switches of the previous switching stages. Inasmuch as the switch structures and the circuit organization by which the selector and connector switches are made responsive to dial pulses are well-known in the automatic telephone art, they are not described in detail except in so far as the structure of the connector 130 has been modified to meet the requirements of this invention. For a more complete description of automatic telephone selectors, together with their operating circuits, reference is made to any suitable text book on automatic telephony, such as, for instance, Smith and Campbell's "Automatic telephony" and particularly to those parts which refer to the construction and operation of "step-by-step" selectors.

When the switching selectors have been operated to extend the calling line to the connector terminals 131, 132 and 133, relay 101 is operated over the line loop in the usual manner, as a result of which an obvious circuit is closed for relay 102 which, in operating, connects ground to terminal 133 from the contacts of relay 103 over its own left contacts to mark the connector as busy and hold the preceding switch train, closes one point in the circuit path of relay 116 at its right outer contacts and further closes a point in the circuit path of vertical magnet 114 and relay 111 through its right inner front contacts.

When the subscriber dials the tens digit of the quotation designation (the hundreds digit having been used to set the selector 110 if the security code is a three-digit number) relay 101 follows the pulses produced by the dial and, on the open period of each pulse when relay 101 is released, a circuit is completed for vertical magnet 114 which extends from battery through the winding of vertical magnet 114, winding of relay 111, normal contacts of the vertical off-normal contact set 108, which does not operate until the vertical magnet has operated to raise the shaft carrying brushes 124, 125 and 126 from its normal position, right inner front contacts of relay 102 which, being a slow-release relay, does not release between pulses, lower inner back contacts of relay 116, back contacts of relay 101, to ground. Magnet 114 operates and raises the brushes to the first terminal level, the off-normal contact set 108 operating as soon as the brush shaft leaves its normal position, and relay 111 operating and locking over its front contact, upper springs of contact set 108 and thence, as traced, to ground on the back contact of relay 101. Relay 111, however, is also slow to release so that it will not release between pulses. With each succeeding impulse of the tens digit, vertical magnet 114 operates to raise the brush shaft to another terminal level until, when the last impulse is received, brushes 124, 125 and 126 have been raised to the terminal level which contains the set of terminals to which the particular tape recorder of the security whose quotation is desired is connected.

After the pulses of the tens digit are transmitted, the subscriber operates the dial 129 in preparation for producing the impulses of the units digit. During the interval between the impulses of these two successive digits, however, relay 111 releases since the interval between the two sets of impulses is longer than the interval between the successive impulses of one digit. When, therefore, the first impulse of the units digit is transmitted and relay 101 releases, a circuit is completed for rotary magnet 113 extending from battery through the winding of rotary magnet 113, winding of slow-release relay 112, back contacts of relay 111, upper springs of contact set 108 and thence, as traced, to ground on the back contacts of relay 101. On the first impulse, the brush shaft is rotated one step and brushes 124, 125 and 126 are brought into contact with the first set of terminals in the terminal level to which said brushes have been raised by the operation of vertical magnet 114. With each succeeding impulse the brushes are rotated to the next terminal set until the last impulse will be effective in setting the brushes on the terminal set of tape recorder desired, at which time relay 101 will reoperate and stay operated and relay 112 will release. A circuit is now completed for relay 116 extending from battery through the winding of said relay, rotary off-normal contacts 134, which closed when the brush shaft took its first rotary step, contacts of relay 112, to ground on the right outer contacts of relay 102. Relay 116 operates, connects the input side of amplifier 119 to brushes 124 and 125 and thence through the back contacts of relay 201 to the output side of amplifier 203, connects ground to brush 126 and completes a circuit thereover to operate relay 205 which, on operating, connects plate battery to amplifier 205, opens the pulsing conductor from the back contacts of relay 101, connects interrupter 117 to the winding of rotary magnet 104 of minor switch 140 and further connects ground to the upper contacts of relay 105 to lock this relay at the proper time.

The subscriber is now in a position to hear reproductions of whatever pronouncement is recorded on the continuously moving tape of the recorder to which his line is connected since the line loop extends to the output side of amplifier 119 through conductors 127 and 128 while the input side of said amplifier responds to the amplified voice reproductions coming from amplifier 203 whose input terminals are, in turn, connected in series with the coils of the voice magnets 218.

Amplifier 119 is a one-stage amplifier or one-way repeater of well-known construction and hence only conventionally indicated. By the use of such an amplifier in the connector, cross-talk from one calling line to another is impossible when two or more subscribers are connected to the same tape recorder pronouncement circuit. At the same time, such an amplifier diminishes the possibility of noise on the terminals and terminal brushes which would otherwise be encountered if all the output "gain" were to come from a two-stage amplifier in the connector circuit.

In order to prevent the possibility of a few lines completely tying up all the connectors available for quotation service, a timing device is provided in the connector 130 by means of minor switch 140 whereby time is counted as soon as the line is cut through to the voice magnets and sufficient time is allowed for a subscriber to obtain at least two quotations after which the line is automatically disconnected.

When interrupter 117 closes one of its grounded segments after the operation of relay 116, a circuit is completed for rotary magnet 104 extending from ground through said interrupter, bottom outer contacts of relay 116, winding of magnet 104 to battery. This magnet operates and steps brush 118 to the first terminal of its associated terminal arc. At each succeeding interrupter pulse, brush 118 steps to a next succeeding terminal until it reaches the ninth terminal, whereupon an obvious circuit is completed for relay 105 which operates and locks over its top contacts to ground on the bottom middle front contacts of relay 116.

When brush 118 reaches the tenth terminal, an obvious circuit is completed for release magnet 106 which, on operating, restores brush 118 back to its normal terminal from which time-counting is again started. When brush 118 reaches the second terminal and with relay 105 operated, a circuit is completed for relay 103 which extends from ground on brush 118 and associated terminal, lower contacts of relay 105, winding of relay 103 to battery. The timing of the interrupter 117 is so adjusted that the total interval between a complete cycle of brush 118 and an additional two steps thereof will equal two complete passages of the tape of recorder 200. When, therefore, relay 103 operates, ground is removed from guard terminal 133 and the train of switches between the calling line and the connector terminals will release whereupon relay 101 will release followed by the release of relay 102 and the consequent release of relay 116 which, in turn, releases relay 205 if no other connector has seized the same recorder and disconnects plate battery from amplifier 203. With the release of relay 116, one circuit is completed to operate the release magnet 106 of the minor switch 140 which extends from ground on the bottom middle back contacts of relay 116, off-normal contacts 107, winding of release magnet 106 to battery. Magnet 106 operates and restores brush 118 to its normal terminal. Another circuit is now completed for the release magnet 115 of the connector switch 130 and extends from battery through the winding of said magnet, vertical off-normal contacts 108, right inner back contacts of relay 102, bottom inner back contacts of relay 116 to ground on the back contacts of relay 101. Magnet 115 operates and restores the shaft carrying brushes 124, 125 and 126 to normal.

By this means, a calling line may obtain only two quotations and is thereafter disconnected automatically from the tape recorder unless it is voluntarily disconnected before that time by the subscriber restoring his receiver in which case the release of relays 101 and 102 releases relay 116 followed by the operation of release magnet 115 and release magnet 106.

What is claimed is:

1. In a stock quotation system, the combination with a magnetic tape recorder having voice-responding magnets and erasing magnets, means for recording voice messages on said tape recorder, a calling telephone line, means for establishing a first listening connection between said calling line and said recorder, a source of tone current, means effective during the recording of voice messages for disrupting said first listening connection and for establishing a connection from said source of tone current to said calling line, an operator's position, and means controlled by said operator effective upon the completion of said message recording for establishing a second listening connection from said recorder to said operator's position.

2. In a stock quotation system, the combination with a magnetic tape recorder having voice-responding magnets and erasing magnets, of means for recording voice messages on said tape recorder, a calling telephone line, means for establishing a first listening connection between said calling line and said recorder, a source of tone current, means effective during the recording of voice messages for disrupting said first listening connection and for establishing a connection from said source of tone current to said calling line, an operator's position, and means controlled by said operator effective upon the completion of said message recording for establishing a second listening connection from said recorder to said operator's position and for holding said last means operated.

3. In a stock quotation system, the combination of a magnetic tape recorder, means for recording voice messages thereon, a calling telephone line, means for establishing a first listening connection between said calling line and said recorder, a source of tone current, a relay operative during the recording of voice messages for disrupting said first listening connection and for establishing a connection from said source of tone current to said calling line, an operator's position, a manually operable key at said position effective upon the completion of said message recording for establishing a second listening connection from said recorder to said operator's position, and a locking circuit for said relay controlled by said key whereby said first listening connection is maintained disrupted while said second listening connection is effective.

4. In a stock quotation system, the combination of a telephone line, a plurality of magnetic tape recorders each having voice-responding magnets and erasing magnets, means for recording a voice message on each of said recorders, means for establishing a first listening connection between said line and any of said recorders, means effective during the recording of a voice message on any recorder to disrupt said listening connection from said line to that particular recorder, an operator's position, a manually controlled means at said position individual to each of said recorders, said means effective upon the completion of the recording of a message on the associated recorder for establishing a second listening connection from said recorder to said operator's position and for holding said first listening connection disrupted.

5. In a stock quotation system, the combination of a telephone line, a plurality of magnetic tape recorders, means for recording a voice message on each of said recorders, means for establishing a first listening connection between said line and any of said recorders, a relay individual to each recorder and operative during the recording of a voice message on its associated recorder for disrupting said listening connection from said line to that recorder, an operator's position, keys at said position individual respectively to said recorders, each key upon its operation being effective upon the completion of said message recording on the associated recorder for establishing a second listening connection from said recorder to said operator's position, and a locking circuit for said relay controlled by said operated key whereby said first listening connection is maintained disrupted while said second listening connection is effective.

6. In a stock quotation system, the combination of a telephone line, a magnetic tape recorder connected to said telephone line, a first operator's position, a second operator's position, means for establishing a voice recording connection between said first position and said recorder for registering a voice message thereon, and means responsive to the completion of said recording operations for establishing a listening connection between said second position and said recorder and for disestablishing said connection between said telephone line and said recorder.

7. In a stock quotation system, the combination of a magnetic tape recorder, an operator's position having a key thereon, means responsive to the operation of said key for establishing a voice recording connection between said position and said recorder for registering a voice message thereon, and means responsive to a time interval required for the complete registration of the voice message on said recorder for disrupting said connection if said key is still operated after the expiration of said time interval.

8. In a stock quotation system, the combination of a magnetic tape, a pair of voice magnets, a pair of erasing magnets, means for causing said magnetic tape to continually pass between the poles of said erasing magnets and the poles of said voice magnets in the order named, a source of tone, an operator's position, a key at said position, means responsive to the operation of said key for establishing a voice recording connection between said position and said voice magnets and for establishing an erasing circuit for said erasing magnets for obliterating existing magnetic records on said magnetic tape as said tape passes between the poles of said erasing magnets, means responsive to the beginning of a time interval which measures the complete passage of said tape between the poles of said voice magnets for momentarily connecting said source of tone to said position to mark the commencement of voice recording operations, means responsive to the expiration of said time interval for again momentarily connecting said source of tone to said position to mark the termination of voice recording operations, and means responsive to the continued operation of said position key at the commencement of the second tone signal for disrupting said voice recording connection and for maintaining said tone signal connected to said position as long as said key remains operated.

9. In a stock quotation system, the combination of a plurality of telephone lines, a magnetic tape having a voice message recorded thereon, a pair of voice magnets between the poles of which said magnetic tape continuously passes, means for establishing separate announcement connections between each of said telephone lines and said magnetic tape, and a one-way repeater in each of said connections for amplifying the announcement currents generated by said magnetic tape in said voice magnets by its passage between the poles thereof and for suppressing any other currents on the line.

10. In an automatic stock quotation system involving a continuously moving magnetic tape having a voice pronouncement recorded thereon, a telephone line, selector switches for establishing a partial connection between said line and said tape, and a connector switch for completing said connection comprising means responsive to the completion of said connection for counting a number of passages of said tape, and means responsive to the counting of said number of passages for releasing said connection.

LAWRENCE H. ALLEN.
JOHN W. GOODERHAM.